United States Patent [19]

Terano et al.

[11] Patent Number: 4,547,476
[45] Date of Patent: Oct. 15, 1985

[54] CATALYST COMPONENT FOR THE POLYMERIZATION OF OLEFINS AND CATALYST THEREFOR

[75] Inventors: Minoru Terano, Chigasaki; Hirokazu Soga, Kanagawa; Masuo Inoue; Katsuyoshi Miyoshi, both of Chigasaki, all of Japan

[73] Assignee: Toho Titanium Co., Ltd., Tokyo, Japan

[21] Appl. No.: 613,178

[22] Filed: May 23, 1984

[30] Foreign Application Priority Data

Jul. 20, 1983 [JP] Japan ................. 58-130873

[51] Int. Cl.$^4$ .............................................. C08F 4/64
[52] U.S. Cl. .................................... 502/127; 502/125; 502/133; 526/124
[58] Field of Search ................. 502/127, 133, 125

[56] References Cited

U.S. PATENT DOCUMENTS

| | | | |
|---|---|---|---|
| 3,094,568 | 6/1963 | Hay et al. ............... | 502/128 X |
| 4,246,136 | 1/1981 | Ueno et al. ............. | 502/127 X |
| 4,439,537 | 3/1984 | Murai et al. ........... | 502/127 X |
| 4,451,688 | 5/1984 | Kuroda et al. .......... | 502/125 X |
| 4,460,701 | 7/1984 | Terano et al. ........... | 502/127 X |

FOREIGN PATENT DOCUMENTS

| | | | |
|---|---|---|---|
| 39-28303 | 12/1964 | Japan ................. | 502/125 |
| 94590 | 7/1979 | Japan . | |
| 91107 | 5/1984 | Japan . | |

*Primary Examiner*—Patrick P. Garvin
*Attorney, Agent, or Firm*—Fisher, Christen & Sabol

[57] ABSTRACT

A catalyst for the polymerization of olefins comprising:
(A) a catalyst component obtained by a process comprising contacting (a) a fatty acid salt of magnesium and (b) dialkoxymagnesium, (c) mono or diester of an aromatic dicarboxylic acid, (d) a halogenated hydrocarbon and (e) a titanium halide of the general formula: $TiX_4$, wherein X represents a halogen atom;
(B) a silicon compound represented by the general formula: $SiR_m(OR')_{4-m}$, wherein R is hydrogen, alkyl group or aryl group, R' is alkyl group or aryl group, and m is represented as $0 \leq m \leq 4$; and
(C) an organoaluminum compound.

Polymerization of olefins by use of the catalyst provides such advantages as high polymerization activity per unit weight of the catalyst component, prolonged polymerization activity, high yield of stereoregular polymer, and a produced polymer free of such an estereal odor as in the prior art.

18 Claims, No Drawings

CATALYST COMPONENT FOR THE POLYMERIZATION OF OLEFINS AND CATALYST THEREFOR

BACKGROUND OF THE INVENTION (1) Field of the Invention

This invention relates to an improved catalyst component for the polymerization of olefins and a catalyst therefor which are capable of providing high polymerization activity per unit weight of the catalyst component and high yield of stereoregular polymer when applied to the polymerization of olefins, and more particularly relates to a catalyst component obtained by contacting a fatty acid salt of magnesium and dialkoxymagnesium, mono or diester of an aromatic dicarboxylic acid, a halogenated hydrocarbon and a titanium halide, and to a catalyst therefor comprising the catalyst component, a silicon compound and an organoaluminium compound, where polymerization includes homopolymerization and copolymerization thereof.

(2) Description of the Prior Art

A catalyst for the polymerization of olefins formed by combining a solid titanium halide as a catalyst component with an organoaluminium compound is well known in the art. However, in the polymerization of olefins by use of the conventional catalyst, the yield of polymer per unit weight of the catalyst component or of titanium moiety in the catalyst component (hereinafter referred to simply as a polymerization activity per unit weight of the catalyst component or of titanium) is so low that the so-called deashing process for subsequently removing catalyst residues from the produced polymer is indispensable in order to obtain an industrially applicable polymer. In the deashing process, alcohols or chelating agents are used in large amounts, so that the deashing process needs an apparatus for recovery thereof as well as the deashing apparatus itself, and consequently has many problems accompanying therewith relative to resources, energy, and the like. Thus, the deashing process raises great problems to be solved urgently in the art. A number of studies and suggestions have been made for enhancing the polymerization activity per unit weight of titanium in the catalyst component, so that the complicated deashing process may be dispensed with.

Especially as a recent tendency, a large number of suggestions have been made such that the polymerization activity per unit weight of titanium in the catalyst component is remarkably enhanced in the polymerization of olefins with a catalyst component prepared by supporting a transition-metal compound as an active ingredient such as a titanium halide on a carrier material so that the active ingredient may act effectively.

However, the prior art employing magnesium chloride as the carrier as described above, has such a disadvantage that the chlorine moiety contained in the magnesium chloride conventionally used as the carrier has an adverse effect on the produced polymer, resulting in leaving problems to be solved such as requirements for such a high activity as to be substantially free from the adverse effect due to the chlorine moiety, or as requirements for controlling a concentration of the magnesium chloride itself at a sufficiently low level.

It was substantially impossible for the so-called highly active supported catalyst formed by use of a catalyst component employing the aforementioned magnesium chloride as a carrier to be of practical use, because use of the supported catalyst results in abrupt deactivation thereof in spite of high activity thereof in the beginning of polymerization, and results in raising problems in process operations, particularly in the case where a prolonged polymerization time is required as in block copolymerization and the like. In order to solve the aforementioned problems, Japanese patent laid-open publication No. 94590/1979 discloses a catalyst for the polymerization of olefins which comprises a catalyst component prepared by use of magnesium dihalide as one of the starting materials, an organoaluminium compound, an aromatic carboxylic acid ester, and a compound having a M—O—R group. However, the catalyst disclosed as above fails to solve the problem of deodorizing from the produced polymer in that organic carboxylic acid esters are used on polymerization, and requires complicated procedures for the preparation thereof with practically insufficient catalyst performance and polymerization activity with time.

SUMMARY OF THE INVENTION

An object of the present invention is to provide a catalyst component for the polymerization of olefins and a catalyst therefor which are capable of resulting in greatly reducing both the amount of the catalyst residues and halogen content in the produced polymer to such an extent that the deashing process may be completely dispensed with.

Another object of the present invention is to provide a catalyst component for the polymerization of olefins and a catalyst therefor which are capable of resulting in high polymerization activity and in much smaller decrease of the polymerization activity with time, or a prolonged polymerization activity.

Still another object of the present invention is to provide a catalyst component for the polymerization of olefins and a catalyst therefor which are capable of resulting in high yield of stereoregular polymer and of the produced polymer free of such an estereal odor as imparted in the case where aromatic carboxylic acid esters are used as the electron donor compound in the prior art.

Still another object of the present invention is to provide a catalyst component for the polymerization of olefins and a catalyst therefor which are capable of resulting in little or no reduction in both the polymerization activity and yield of stereoregular polymer in the case where polymerization of olefins is carried out in the presence of hydrogen and the produced polymer has a very high melt index.

That is, the present invention provides a catalyst component (A) for the polymerization of olefins obtained by a process comprising contacting (a) a fatty acid salt of magnesium and (b) dialkoxymagnesium, (c) mono or diester of an aromatic dicarboxylic acid, (d) a halogenated hydrocarbon, and (e) a titanium halide of the general formula: $TiX_4$, wherein X represents a halogen atom, said catalyst component being used in combination with (B) a silicon compound represented by the general formula: $SiR_m(OR')_{4-m}$, wherein R is hydrogen, alkyl group, or aryl group, R' is alkyl group or aryl group, and m is represented as $0 \leq m \leq 4$, and with (C) an organoaluminium compound; and a catalyst for the polymerization of olefins comprising: (A) a catalyst component obtained by a process comprising contacting (a) a fatty acid salt of magnesium and (b) dialkoxymagnesium, (c) mono or diester of an aromatic dicarboxylic acid, (d) a halogenated hydrocarbon, and (e) a titanium halide of the general formula: $TiX_4$, wherein X represents a halogen atom, (B) a silicon compound represented by the general formula: $SiR_m(OR')_{4-m}$, wherein R is hydrogen, alkyl group or aryl group, R' is alkyl group or aryl group, and m is represented as $0 \leq m \leq 4$, and (C) an organoaluminium compound.

Polymerization of olefins by use of the catalyst component or the catalyst of the present invention shows such a high catalyst activity to say nothing of an extremely high stereoregularity in the produced polymer that the amount of the catalyst residues in the produced polymer is reduced to a very low level, and chlorine content in the produced polymer is reduced to a trace amount, resulting in that influence of chlorine on the produced polymer is reduced to such an extent that the deashing process may be completely dispensed with.

Since chlorine contained in the produced polymer causes corrosion of devices employed in such steps as pelletizing and molding, and further causes deterioration, yellowing, etc. of the produced polymer itself, reduction of chlorine content in the produced polymer as above has an extremely important meaning in the art.

Further features of the present invention reside in that the problem of the estereal odor in the produced polymer has been solved without using aromatic carboxylic acid esters on polymerization, and that such a substantial defect of the so-called highly active supported catalyst as mentioned above that catalyst activity per unit time is greatly reduced as polymerization proceeds has been overcome to provide a catalyst practically applicable to copolymerization of olefins as well as homopolymerization thereof.

It is of a common practice in the preparation of olefin polymer on an industrial scale that polymerization is carried out in the presence of hydrogen from the standpoints of controlling the melt index of polymer, etc., and the catalyst formed from the catalyst component prepared by use of magnesium chloride as a carrier in the prior art has such a disadvantage that both catalytic activity and stereoregularity of the polymer are greatly reduced. However, polymerization of olefins in the presence of hydrogen using the catalyst of the present invention provides such an effect that little or no decrease in catalytic activity and in stereoregularity of the polymer is observed in spite of a very high melt index of the polymer, providing extremely great advantages in the art.

DETAILED DESCRIPTION OF THE PREFERRED EMBODIMENTS

Examples of the fatty acid salt of magnesium used in the present invention preferably include saturated fatty acid salt of magnesium, more preferably magnesium stearate, magnesium octanoate, magnesium decanoate, and magnesium laurate.

Examples of the dialkoxymagnesium used in the present invention include diethoxymagnesium, dibutoxymagnesium, diphenoxymagnesium, dipropoxymagnesium, disec-butoxymagnesium, di-tert-butoxymagnesium, diisopropoxymagnesium, and the like, preferably including diethoxymagnesium and dipropoxymagnesium.

The fatty acid salt of magnesium and dialkoxymagnesium are employed preferably in such a state that the moisture contained therein has been removed therefrom to be reduced to a minimum.

Examples of mono or diester of aromatic dicarboxylic acid preferably include mono or diester of phthalic acid or terephthalic acid, more specifically, dimethylphthalate, dimethylterephthalate, diethylphthalate, diethylterephthalate, dipropylphthalate, dipropylterephthalate, dibutylphthalate, dibutylterephthalate, diisobutylphthalate, diamylphthalate, diisoamylphthalate, ethylbutylphthalate, ethylisobutylphthalate, ethylpropylphthalate, and the like.

The halogenated hydrocarbon used in the present invention preferably includes chlorides of liquid aromatic or aliphatic hydrocarbon, more preferably, examples thereof include propyl chloride, butyl chloride, butyl bromide, propyl iodide, chlorobenzene, benzyl chloride, dichloroethane, trichloroethylene, dichloropropane, dichlorobenzene, trichloroethane, carbon tetrachloride, chloroform, methylene dichloride, and the like, most preferably including propyl chloride, dichloroethane, chloroform, and methylene dichloride.

Examples of the titanium halide represented by the general formula $TiX_4$ wherein X is a halogen atom, include titanium tetrachloride, titanium tetrabromide, titanium tetraiodide, and the like, the titanium tetrachloride being preferred.

The silicon compound used in the present invention includes phenylalkoxysilane, alkylalkoxysilane, and the like. Examples of phenylalkoxysilane include phenyltrimethoxysilane, phenyltriethoxysilane, phenyltripropoxysilane, phenyltriisopropoxysilane, diphenyldimethoxysilane, diphenyldiethoxysilane, and the like. Examples of alkylalkoxysilane include tetramethoxysilane, tetraethoxysilane, trimethoxyethylsilane, trimethoxymethylsilane, triethoxymethylsilane, ethyltriethoxysilane, ethyltriisopropoxysilane, and the like.

Examples of the organoaluminium compound used in the present invention include trialkoxyaluminium dialkylaluminium halide, alkylaluminium dihalide, and mixtures thereof, preferably trialkylaluminium, more preferably triethylaluminium and triisobutylaluminium.

The amount to be used of the ingredients for the preparation of the catalyst component is not specifically limited unless it has adverse effects on the performance of the catalyst component formed therefrom, but mono or diester of aromatic dicarboxylic acid is used normally in an amount of from 0.01 to 2 g, preferably from 0.1 to 1 g, and the titanium halide is used normally in an amount more than 0.1 g, preferably more than 1 g per 1 g of the fatty acid salt of magnesium and dialkoxymagnesium respectively. The halogenated hydrocarbon may be used in an arbitrary amount, preferably in such an amount as to form a suspension.

The contacting order and manner of the starting materials used for the formation of the catalyst component are not specifically limited, but preferably including the following processes:

(1) a process which comprises suspending the ingredients (a) and (b) into the ingredient (d), and adding a resulting suspension to the ingredient (e) for reaction, the ingredient (c) being present in at least one of the stages in the course of the process as well as other ingredients (a), (b), (d) and (e);

(2) a process which comprises suspending the ingredient (a) into the ingredient (d), and adding a resulting suspension to the ingredient (e) containing the ingredient (b) for reaction, the ingredient (c) being present in at least one of the stages in the course of the process as well as other ingredients (a), (b), (d) and (e); and (3) a process which comprises suspending the ingredient (b) into the ingredient (d), and adding a resulting suspension to the ingredient (e) containing the ingredient (a) for reaction, the ingredient (c) being present in at least one of the stages in the course of the process as well as other ingredients (a), (b), (d) and (e).

The starting materials used for the formation of the catalyst component of the present invention are brought into contact under such conditions that fatty acid salt of magnesium and/or dialkoxymagnesium is suspended into halogenated hydrocarbon preferably in such a manner as to keep under suspension at a temperature of from generally 0° C. to boiling point of the halogenated hydrocarbon used for less than 100 hours, preferably for less than 10 hours in the presence of or in the absence of mono or diester of aromatic dicarboxylic acid.

The resulting suspensions as above are preferably brought into contact with titanium halide or with titanium halide containing fatty acid salt of magnesium or dialkoxymagnesium respectively at a temperature generally of from −10° C. to boiling point of titanium halide used for a period of time from 10 minutes to 100 hours in the presence of or in the absence of mono or diester of aromatic dicarboxylic acid.

The compositions obtained according to the aforementioned processes in the preparation of the catalyst component may be further brought into contact once or more times with the titanium halide, and also may be washed with an organic solvent such as n-heptane.

All the procedures described above in the present invention should be preferably conducted in the absence of oxygen, water, etc.

The catalyst component thus obtained is combined with the aforementioned silicon compound and an organoaluminium compound to form a catalyst for the polymerization of olefins. The organoaluminium compound is used in a molar ratio of from 1 to 1000 per atom of titanium in the catalyst component, and the silicon compound is used in a molar ratio of less than 1, preferably from 0.005 to 0.5 per mole of the organoaluminium compound.

The polymerization of olefins may be performed in the presence of, or in the absence of an organic solvent, and olefin monomers may be used in the gaseous or liquid state.

The polymerization temperature is below 200° C., preferably below 100° C., and the polymerization pressure is below 100 kg/cm² gauge, preferably below 50 kg/cm² gauge.

Examples of olefins homopolymerized or copolymerized by use of the catalyst component and the catalyst of the present invention include ethylene, propylene, 1-butene, and the like.

The following Examples and Comparative Examples illustrate the present invention more in detail.

EXAMPLE 1

(Preparation of catalyst component)

To a 200 ml round flask fitted with a stirrer and thoroughly purged with nitrogen are charged 5 g of magnesium stearate, 5 g of diethoxymagnesium, 1.5 g of dipropyl phthalate, and 50 ml of methylene dichloride to form a suspension followed by stirring for 1 hour under reflux. The suspension is then injected into 200 ml of $TiCl_4$ at room temperature in a 500 ml round flask fitted with a stirrer followed by heating up to 90° C. for reacting with agitation at that temperature for 2 hours. After the completion of the reaction, a reaction product is washed 10 times with 200 ml of dehydrated n-heptane at 40° C., and 200 ml of fresh titanium tetrachloride is added thereto for reacting with agitation at 90° C. for 2 hours. After the completion of the reaction, the reaction mixture is cooled down to 40° C. A washing procedure with 200 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 3.86% by weight.

Polymerization of propylene

To a 2.0 liter autoclave fitted with a stirrer, the air in which is thoroughly replaced by nitrogen, 700 ml of n-heptane, 301 mg of triethylaluminium, 32 mg of phenyltriethoxysilane and 0.3 mg as titanium atom of the catalyst component obtained as above are charged in an atmosphere of nitrogen. Thereafter 300 ml of hydrogen gas is charged thereinto and the resulting mixture is heated to 70° C. and subjected to propylene polymerization under a pressure of 6 kg/cm² gauge for 4 hours introducing thereinto propylene gas. After the completion of polymerization reaction, solid polymer thus obtained is collected by filtration and dried by heating at 80° C. under reduced pressure. On the other hand, the filtrate is thickened to obtain polymer soluble in a solvent used in polymerization.

The amount of the polymer soluble in the solvent used in polymerization is represented by (A), and the amount of the solid polymer obtained as above is represented by (B). The solid polymer is subjected to extraction with boiling n-heptane for 6 hours to obtain polymer insoluble in boiling n-heptane, the amount of which is represented by (C). The polymerization activity (D) per unit weight of the catalyst component is represented by the formula $$(D) = \frac{[(A) + (B)] (g)}{\text{amount of catalyst component (g)}}$$

and the yield (E) of crystalline polymer is represented by the formula $$(E) = \frac{(C)}{(B)} \times 100\%.$$

Further, the overall yield (F) of crystalline polymer is represented by the formula $$(F) = \frac{(C)}{(A) + (B)} \times 100\%.$$

The chlorine content and melt index of the produced polymer are represented by (G) and (H) respectively.

Results thus obtained are shown in Table-1.

EXAMPLE 2

The procedures of Example 1 are repeated except that polymerization reaction is effected for 6 hours. Results thus obtained are shown in Table-1.

EXAMPLE 3

The procedures of Example 1 are repeated except that 1.2 g of dipropylphthalate is used to prepare a catalyst component. The titanium content in the solids separated is 3.54% by weight.

In the polymerization of propylene, the procedures of Example 1 are also repeated except that 64 mg of phenyltriethoxysilane is used. Results thus obtained are shown in Table-1.

EXAMPLE 4

The procedures of Example 1 are repeated except that the suspension is injected under pressure into titanium tetrachloride at 0° C. to prepare a catalyst component. The titanium content in the solids separated is 3.62% by weight. In the polymerization of propylene, the procedures of Example 1 are repeated. Results thus obtained are shown in Table-1.

EXAMPLE 5

The procedures of Example 1 are repeated except that reaction with titanium tetrachloride is effected at 100° C. to prepare a catalyst component. The titanium content in the solids separated is 3.12% by weight. In the polymerization of propylene, the procedures of Example 1 are repeated. Results thus obtained are shown in Table-1.

EXAMPLE 6

The procedures of Example 1 are repeated except that 2.0 g of dibutylphthalate instead of dipropylphthalate is used to prepare a catalyst component. The titanium content in the solids separated is 2.91% by weight. In the polymerization of propylene, the procedures of Example 1 are repeated. Results thus obtained are shown in Table-1.

EXAMPLE 7

The procedures of Example 1 are repeated except that 2.0 g of diamylphthalate instead of dipropylphthalate is used to prepare a catalyst component. The titanium content in the solids separated is 3.70% by weight. In the polymerization of propylene, the procedures of Example 1 are repeated. Results thus obtained are shown in Table-1.

EXAMPLE 8

The procedures of Example 1 are repeated except that magnesium laurate instead of magnesium stearate is used to prepare a catalyst component. The titanium content in the solids separated is 3.52% by weight. In the polymerization of propylene, the procedures of Example 1 are repeated. Results thus obtained are shown in Table-1.

EXAMPLE 9

The procedures of Example 1 are repeated except that carbon tetrachloride instead of methylene dichloride is used to prepare a catalyst component. The titanium content in the solids separated is 3.48% by weight. In the polymerization of propylene, the procedures of Example 1 are repeated. Results thus obtained are shown in Table-1.

EXAMPLE 10

The procedures of Example 1 are repeated except that chloroform instead of methylene dichloride is used to prepare a catalyst component. The titanium content in the solids separated is 3.61% by weight. In the polymerization of propylene, the procedures of Example 1 are repeated. Results thus obtained are shown in Table-1.

EXAMPLE 11

To a 100 ml round flask fitted with a stirrer and thoroughly purged with nitrogen are charged 5 g of diethoxymagnesium and 50 ml of methylene dichloride to form a suspension followed by stirring for 1 hour under reflux. Separately therefrom, to a 500 ml round flask fitted with a stirrer and thoroughly purged with nitrogen are charged 5 g of magnesium stearate, 1.5 g of dipropylphthalate and 200 ml of $TiCl_4$ to be reacted with agitation at room temperature for one hour. Thereafter, the former suspension is injected into the latter reaction mixture followed by heating to 90° C. for allowing to react with agitation at the elevated temperature for 2 hours. Thereafter the procedures of Example 1 are repeated to prepare a catalyst component. The titanium content in the solids separated is 3.50% by weight.

In the polymerization of propylene, the procedures of Example 1 are repeated. Results thus obtained are shown in Table-1.

COMPARATIVE EXAMPLE 1

(Preparation of catalyst component)

100 g of $MgCl_2$ and 31.5 g of ethyl benzoate are copulverized under an atmosphere of nitrogen for 18 hours. 100 g of the copulverized product is charged into a 2000 ml glass flask under an atmosphere of nitrogen, and 500 ml of $TiCl_4$ is added thereto to be reacted with agitation at 65° C. for 2 hours. After the completion of the reaction, the reaction mixture is cooled down to 40° C. and left at rest for removing the resulting supernatant liquid by decanting.

A washing procedure with 1000 ml of n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 1.28% by weight.

In the polymerization of propylene, the procedures of Example 1 are repeated except that 1.0 mg as titanium atom of the catalyst component is added thereto. Results thus obtained are shown in Table-1.

COMPARATIVE EXAMPLE 2

The procedures of Example 1 are repeated except that 2.0 ml of ethyl benzoate in place of dipropylphthalate is used to prepare a catalyst component. The titanium content in the solids separated is 3.83% by weight.

In the polymerization of propylene, the procedures of Example 1 are repeated except that 137 mg of ethyl p-toluate and 0.5 mg as titanium atom of the catalyst component are used. Results thus obtained are shown in Table-1.

TABLE 1

| | Examples | | | | | | | | | | | Comparative Examples | |
|---|---|---|---|---|---|---|---|---|---|---|---|---|---|
| | 1 | 2 | 3 | 4 | 5 | 6 | 7 | 8 | 9 | 10 | 11 | 1 | 2 |
| Amount of polymer soluble in the solvent used in polymerization (A) g | 6.1 | 8.4 | 6.8 | 6.4 | 6.2 | 6.9 | 6.2 | 7.2 | 6.0 | 7.0 | 6.8 | 7.3 | 7.4 |
| Amount of solid polymer (B) g | 226 | 314 | 248 | 241 | 253 | 276 | 220 | 240 | 227 | 239 | 243 | 372 | 336 |
| Amount of polymer insoluble in boiling n-heptane (C) g | 223 | 310 | 244 | 238 | 250 | 272 | 216 | 236 | 223 | 236 | 240 | 352 | 325 |
| Polymerization activity per unit weight of catalyst component (D) | 29900 | 41500 | 30100 | 29800 | 27000 | 27500 | 27900 | 29000 | 27000 | 29600 | 29100 | 4860 | 26400 |
| Yield of crystalline polymer (E) (%) | 98.7 | 98.7 | 98.4 | 98.7 | 98.8 | 98.6 | 98.2 | 98.3 | 98.2 | 98.7 | 98.8 | 94.6 | 96.7 |
| Overall yield of crystalline polymer (F) (%) | 96.1 | 96.2 | 95.8 | 96.2 | 96.5 | 96.1 | 95.5 | 95.5 | 95.7 | 95.9 | 96.1 | 92.8 | 94.6 |
| Chlorine content in the produced polymer (G) ppm | 18 | 13 | 18 | 18 | 21 | 20 | 20 | 19 | 20 | 18 | 19 | 138 | 22 |
| Melt index of the produced polymer (H) | 26.5 | 29.3 | 22.1 | 23.0 | 15.1 | 17.2 | 12.6 | 26.1 | 27.3 | 21.6 | 26.0 | 3.1 | 6.9 |

What is claimed is:

1. A catalyst component (A) for the polymerization of olefins obtained by a process comprising contacting (a) a fatty acid salt of magnesium and (b) dialkoxymagnesium, (c) mono or diester of an aromatic dicarboxylic acid, (d) a halogenated hydrocarbon, and (e) a titanium halide of the general formula: $TiX_4$, wherein X represents a halogen atom, said catalyst component being used in combination with (B) a silicon compound represented by the general formula: $SiR_m(OR')_{4-m}$, wherein R is hydrogen, alkyl group, or aryl group, R' is alkyl group or aryl group, and m is represented as $0 \leq m \leq 4$, and with (C) an organoaluminium compound.

2. A catalyst component according to claim 1, wherein said catalyst component is obtained by a process which comprises suspending the ingredients (a) and (b) into the ingredient (d), and adding a resulting suspension to the ingredient (e) for reaction, the ingredient (c) being present in at least one of the stages in the course of the process as well as other ingredients (a), (b), (d) and (e).

3. A catalyst component according to claim 1, wherein said catalyst component is obtained by a process which comprises suspending the ingredient (a) into the ingredient (d), and adding a resulting suspension to the ingredient (e) containing the ingredient (b) for reaction, the ingredient (c) being present in at least one of the stages in the course of the process as well as other ingredients (a), (b), (d) and (e).

4. A catalyst component according to claim 1, said catalyst component is obtained by a process which comprises suspending the ingredient (b) into the ingredient (d), and adding a resulting suspension to the ingredient (e) containing the ingredient (a) for reaction, the ingredient (c) being present in at least one of the stages in the course of the process as well as other ingredients (a), (b), (d) and (e).

5. A catalyst component according to claim 1, wherein said fatty acid salt of magnesium is saturated fatty acid salt of magnesium.

6. A catalyst component according to claim 5, wherein said saturated fatty acid salt of magnesium is selected from magnesium stearate, magnesium octanoate, magnesium decanoate and magnesium laurate.

7. A catalyst component according to claim 1, wherein dialkoxymagnesium is selected from diethoxymagnesium and dipropoxymagnesium.

8. A catalyst component according to claim 1, wherein mono or diester of aromatic dicarboxylic acid is selected from mono or diester of phthalic acid or terephthalic acid.

9. A catalyst component according to claim 8, wherein mono or diester of phthalic acid or terephthalic acid is selected from dimethylphthalate, dimethylterephthalate, diethylphthalate, diethylterephthalate, dipropylphthalate, dipropylterephthalate, dibutylphthalate, dibutylterephthalate, diisobutylphthalate, diamylphthalate, diisoamylphthalate, ethylbutylphthalate, ethylisobutylphthalate and ethylpropylphthalate.

10. A catalyst component according to claim 1, wherein said halogenated hydrocarbon is selected from chlorides of aromatic or aliphatic hydrocarbon in the liquid state at room temperature.

11. A catalyst component according to claim 1, wherein said halogenated hydrocarbon is selected from chlorobenzene, benzylchloride, propylchloride, butylchloride, dichloroethane, trichloroethane, carbon tetrachloride, chloroform and methylene dichloride.

12. A catalyst component according to claim 1, wherein said titanium halide is titanium tetrachloride.

13. A catalyst component according to claim 1, wherein said silicon compound is selected from phenyl and alkylalkoxysilane.

14. A catalyst component according to claim 1, wherein said organoaluminium compound is selected from triethylaluminium and triisobutylaluminium.

15. A catalyst for the polymerization of olefins comprising:
(A) a catalyst component obtained by a process comprising contacting (a) a fatty acid salt of magnesium and (b) dialkoxymagnesium, (c) mono or diester of an aromatic dicarboxylic acid, (d) a halogenated hydrocarbon, and (e) a titanium halide of the general formula: TiX$_4$, wherein X represents a halogen atom, (B) a silicon compound represented by the general formula: SiR$_m$(OR')$_{4-m}$, wherein R is hydrogen, alkyl group or aryl group, R' is alkyl group or aryl group, and m is represented as $0 \leq m \leq 4$, and (C) an organoaluminium compound.

16. A catalyst according to claim 15, wherein said catalyst component (A) is obtained by a process which comprises suspending the ingredients (a) and (b) into the ingredient (d), and adding a resulting suspension to the ingredient (e) for reaction, the ingredient (c) being present in at least one of the stages in the course of the process as well as other ingredients (a), (b), (d) and (e); a process which comprises suspending the ingredient (a) into the ingredient (d), and adding a resulting suspension to the ingredient (e) containing the ingredient (b) for reaction, the ingredient (c) being present in at least one of the stages in the course of the process as well as other ingredients (a), (b), (d) and (e); or a process which comprises suspending the ingredient (b) into the ingredient (d), and adding a resulting suspension to the ingredient (e) containing the ingredient (a) for reaction, the ingredient (c) being present in at least one of the stages in the course of the process as well as other ingredients (a), (b), (d) and (e).

17. A catalyst according to claim 15, wherein said silicon compound is selected from phenyl and alkylalkoxysilane.

18. A catalyst according to claim 15, wherein said organoaluminium compound is selected from triethylaluminium and triisobutylaluminium.

* * * * *